(12) United States Patent
Wolf et al.

(10) Patent No.: US 9,468,913 B2
(45) Date of Patent: Oct. 18, 2016

(54) CATALYST AND METHOD FOR THE PRODUCTION OF CHLORINE BY GAS PHASE OXIDATION

(75) Inventors: Aurel Wolf, Wülfrath (DE); Leslaw Mleczko, Dormagen (DE); Oliver Felix-Karl Schlüter, Leverkusen (DE)

(73) Assignee: Covestro Deutschland AG, Leverkusen (DE)

( * ) Notice: Subject to any disclaimer, the term of this patent is extended or adjusted under 35 U.S.C. 154(b) by 730 days.

(21) Appl. No.: 13/818,322

(22) PCT Filed: Aug. 22, 2011

(86) PCT No.: PCT/EP2011/064368
§ 371 (c)(1),
(2), (4) Date: Mar. 11, 2013

(87) PCT Pub. No.: WO2012/025482
PCT Pub. Date: Mar. 1, 2012

(65) Prior Publication Data
US 2013/0177494 A1 Jul. 11, 2013

(30) Foreign Application Priority Data
Aug. 25, 2010 (DE) ........................ 10 2010 039 734

(51) Int. Cl.
| | | |
|---|---|---|
| C01B 7/00 | (2006.01) |
| B01J 27/135 | (2006.01) |
| B01J 27/13 | (2006.01) |
| B01J 23/00 | (2006.01) |
| B01J 23/40 | (2006.01) |
| B01J 23/42 | (2006.01) |
| B01J 23/20 | (2006.01) |
| B01J 23/62 | (2006.01) |
| B01J 23/63 | (2006.01) |
| B01J 23/648 | (2006.01) |
| B01J 23/652 | (2006.01) |
| B01J 37/02 | (2006.01) |
| B01J 37/03 | (2006.01) |
| C01B 7/04 | (2006.01) |
| B01J 35/08 | (2006.01) |

(52) U.S. Cl.
CPC ............... B01J 27/135 (2013.01); B01J 23/20 (2013.01); B01J 23/626 (2013.01); B01J 23/63 (2013.01); B01J 23/648 (2013.01); B01J 23/6484 (2013.01); B01J 23/6486 (2013.01); B01J 23/652 (2013.01); B01J 37/0201 (2013.01); B01J 37/033 (2013.01); C01B 7/04 (2013.01); B01J 35/08 (2013.01)

(58) Field of Classification Search
CPC ...... B01J 23/14; B01J 23/462; B01J 23/622; B01J 23/63; B01J 23/64; B01J 27/06; B01J 27/08; B01J 27/10; B01J 27/125; B01J 27/135; C01B 7/04

USPC ......... 502/227, 230, 310, 326, 352; 423/502
See application file for complete search history.

(56) References Cited

U.S. PATENT DOCUMENTS

| | | | |
|---|---|---|---|
| 5,908,607 A | 6/1999 | Abekawa et al. | |
| 5,973,210 A * | 10/1999 | Jacquot .................. | B01J 23/626 502/261 |
| 5,985,789 A * | 11/1999 | Tooley ................... | B01J 23/626 502/326 |
| 6,180,830 B1 * | 1/2001 | Jacquot ................. | B01J 23/626 502/227 |
| 6,329,063 B2 * | 12/2001 | Lo ......................... | 257/E21.125 |
| 6,355,854 B1 | 3/2002 | Liu | |
| RE37,663 E * | 4/2002 | Golunski ............... | B01J 21/066 502/325 |
| 6,790,432 B2 * | 9/2004 | Ruettinger .............. | B01J 23/62 423/656 |
| 7,056,856 B2 * | 6/2006 | Summers ............. | B01D 53/945 502/302 |
| 7,318,915 B2 * | 1/2008 | Jordan .................. | B01D 53/865 423/245.3 |
| 7,375,049 B2 * | 5/2008 | Hayes .................... | B01J 23/626 208/137 |
| 7,390,768 B2 * | 6/2008 | Jordan ............... | B01D 53/9454 423/245.3 |
| 7,740,827 B2 * | 6/2010 | Felthouse ................ | B01J 21/06 423/522 |
| 7,976,989 B2 * | 7/2011 | Lopez .................... | B01J 23/468 204/290.09 |
| 7,985,709 B2 * | 7/2011 | Jordan ............... | B01D 53/9454 502/242 |
| 8,263,290 B2 * | 9/2012 | Lopez .................... | B01J 23/468 204/290.09 |
| 8,475,755 B2 * | 7/2013 | Dang .................... | B01D 53/864 423/240 S |
| 8,801,961 B2 * | 8/2014 | Weidner ............... | C01G 23/047 252/182.33 |
| 8,889,578 B2 * | 11/2014 | Schmidt ................. | B01J 23/96 502/37 |
| 9,091,433 B2 * | 7/2015 | Mabande ............. | B01J 19/2485 |
| 2002/0172640 A1 | 11/2002 | Hibi et al. | |

(Continued)

FOREIGN PATENT DOCUMENTS

| | | |
|---|---|---|
| CA | 2114598 A1 | 7/1994 |
| DE | 1567788 A1 | 5/1970 |

(Continued)

OTHER PUBLICATIONS

International Search Report for PCT/EP2011/064368 mailed Feb. 16, 2012.

Primary Examiner — Cam N. Nguyen
(74) Attorney, Agent, or Firm — K&L Gates, LLP

(57) ABSTRACT

The present invention relates to a catalyst for preparation of chlorine by catalytic gas phase oxidation of hydrogen chloride with oxygen, in which the catalyst comprises at least tin dioxide as a support material and at least one ruthenium-containing compound as a catalytically active material, and comprises, as an additional secondary constituent, a compound of an element or an element selected from the group of: Nb, V, Ta, Cr, Mo, Au, In, Sc, Y and lanthanoids, especially La and Ce.

20 Claims, No Drawings

(56) References Cited

U.S. PATENT DOCUMENTS

| | | | |
|---|---|---|---|
| 2004/0266612 A1* | 12/2004 | Hayes | B01J 23/626 502/240 |
| 2007/0274897 A1 | 11/2007 | Wolf et al. | |
| 2007/0274901 A1 | 11/2007 | Wolf et al. | |
| 2007/0292336 A1 | 12/2007 | Wolf et al. | |
| 2008/0233039 A1* | 9/2008 | Hagemeyer | B01D 53/865 423/351 |
| 2008/0267849 A1 | 10/2008 | Haas et al. | |
| 2008/0267857 A1 | 10/2008 | Schlueter et al. | |
| 2008/0287282 A1 | 11/2008 | Haas et al. | |
| 2009/0088317 A1* | 4/2009 | Frye, Jr. | C07C 29/60 502/178 |
| 2010/0113260 A1* | 5/2010 | Hagemeyer | B01J 23/002 502/185 |

FOREIGN PATENT DOCUMENTS

| | | |
|---|---|---|
| DE | 19734412 A1 | 2/1998 |
| DE | 19748299 A1 | 5/1998 |
| DE | 102007020140 A1 | 11/2007 |
| DE | 102007020154 A1 | 11/2007 |
| DE | 102007020096 A1 | 10/2008 |
| DE | 102007020142 A1 | 10/2008 |
| EP | 0609122 A1 | 8/1994 |
| EP | 0936184 A2 | 8/1999 |
| GB | 1046313 A | 10/1966 |
| WO | WO-2007134721 A2 | 11/2007 |
| WO | WO-2007134772 A1 | 11/2007 |
| WO | WO-2008131857 A1 | 11/2008 |

* cited by examiner

CATALYST AND METHOD FOR THE PRODUCTION OF CHLORINE BY GAS PHASE OXIDATION

RELATED APPLICATIONS

This application is a national stage application (under 35 U.S.C. §371) of PCT/EP2011/064368, filed Aug. 22 2011, which claims benefit of German application 10 2010 039 734.2, filed Aug. 25, 2010.

The invention proceeds from known processes for preparing chlorine by catalytic gas phase oxidation of hydrogen chloride with oxygen, in which the catalyst comprises tin dioxide as a support and at least one halogen- and/or oxygen-containing ruthenium compound. The invention relates to a catalyst composition and to the use thereof.

The process developed by Deacon in 1868 for catalytic hydrogen chloride oxidation with oxygen in an exothermic equilibrium reaction was at the genesis of industrial chlorine chemistry:

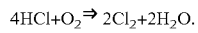

Chloralkali electrolysis, however, eclipsed the Deacon process to a substantial degree. Virtually all chlorine was produced by electrolysis of aqueous sodium chloride solutions [Ullmann Encyclopedia of industrial chemistry, seventh release, 2006]. However, the attractiveness of the Deacon process has been increasing recently, since global chlorine demand is growing faster than the demand for sodium hydroxide solution. This development is favorable for the process for preparing chlorine by oxidation of hydrogen chloride decoupled from the preparation of sodium hydroxide solution. In addition, hydrogen chloride is obtained as a coproduct in large amounts in phosgenation reactions, for instance in isocyanate preparation.

The oxidation of hydrogen chloride to chlorine is an equilibrium reaction. The equilibrium position shifts with increasing temperature to disfavor the desired end product. It is therefore advantageous to use catalysts with maximum activity which allow the reaction to proceed at relatively low temperature.

As the current state of the art, ruthenium-based catalysts are used for HCl oxidation. The first catalysts for hydrogen chloride oxidation with ruthenium as the catalytically active component were described as early as 1965 in DE 1 567 788, in this case proceeding from $RuCl_3$, for example supported on silicon dioxide and aluminum oxide. Further Ru-based catalysts with ruthenium oxide or mixed ruthenium oxide active as the active composition and various oxides as the support material, for example titanium dioxide, zirconium dioxide, etc. were described in DE-A 197 48 299, DE-A 197 34 412 and EP 0 936 184 A2.

In addition, documents WO 2007/134772 A1 and WO 2007/134721 A1 disclose ruthenium-based catalyst systems which are supported on tin dioxide and whose activity clearly stands out from the previous prior art.

However, a disadvantage of the catalyst systems described in WO 2007/134772 A1 and WO 2007/134721 A1 is that, under the reaction conditions of the HCl gas phase oxidation, tin is discharged from the support material, probably in the form of the volatile compound $SnCl_4$. This is negative particularly for the lifetime of the catalysts, since the mechanical stability is gradually reduced by the advancing loss of tin. An additional factor is that the tin chloride discharged has to be removed from the product. Accordingly, there is a need for a process which increases the chemical stability of the catalysts known from WO 2007/134772 A1 and WO 2007/134721 A1 with respect to the discharge of tin, without impairing the superior activity thereof.

It is thus an object of the present invention to increase the chemical stability of the catalysts known from WO 2007/134772 A1 and WO 2007/134721 A1 with respect to the discharge of tin, without impairing the superior activity thereof. The object is achieved by doping the tin dioxide prior to the application of the catalytically active material.

It has now been found that, surprisingly, the doping of the tin dioxide with selected metals prior to the application of the catalytically active material can increase both the chemical stability of the catalyst under the reaction conditions of the HCl gas phase oxidation and the activity.

The invention provides a catalyst composition comprising at least tin dioxide as a support material and at least one ruthenium-containing compound as a catalytically active material, characterized in that the support material comprises, as an additional secondary constituent, a compound of an element or an element selected from the group of: Nb, V, Ta, Cr, Mo, Au, In, Sc, Y and lanthanoids, especially La and CE, preferably niobium or a niobium compound, especially preferably niobium oxide.

The secondary constituent is present especially in the form of a dopant. Doping is preferably understood here to mean a homogeneous distribution of the secondary constituent in the lattice structure of the host material (e.g. tin dioxide).

The invention also further provides a process for preparing chlorine by catalytic gas phase oxidation of hydrogen chloride with oxygen, in which the catalyst comprises at least tin dioxide doped with a compound of an element or an element selected from the group of: Nb, V, Ta, Cr, Mo, Au, In, Sc, Y and lanthanoids, especially La and Ce, and a ruthenium compound.

In a preferred embodiment, doped tin dioxide is used as the support for the catalytically active component, tin dioxide being in the cassiterite structure.

The doped tin dioxide comprises, as well as tin, at least one compound of an element or an element selected from the group of Nb, Ce, La, Y, Sc, V, Mo, Cr, Au, preferably Nb. The proportion of the dopant is in the range from 0.01 to 30% by weight, preferably 0.05 to 20% by weight and very preferably 0.1 to 10% by weight, based on the total weight of tin dioxide and secondary constituent.

The doped tin dioxide may, without being limited thereto, be prepared by coprecipitation of suitable soluble tin salts and doping element salts, by high-temperature treatment of the salts, by physical vapor deposition (PVD), chemical vapor deposition (CVD), spray pyrolysis of suitable solutions, etc., the preparation preferably being performable by coprecipitation.

The coprecipitation can be performed batchwise, semi-continuously or continuously. The precipitation can be brought about, for example, by a change in temperature or in concentration (including by vaporization of the solvent), by a change in pH and/or by the addition of a precipitating agent, or combinations thereof. The coprecipitation can preferably be performed by adding a precipitating reagent. Customary apparatuses for this purpose are stirred tanks, static mixers, valve mixers, micromixers, nozzle apparatuses, which ensure intensive mixing of salt solution and precipitating reagent.

It is possible to use various starting compounds, provided that Sn precursor and the salt of the doping element are soluble in the solvent used, i.e. can also be coprecipitated in the case of coprecipitation. Examples of these starting compounds are acetates, nitrates, chlorides and further soluble compounds.

Preferred solvents are short-chain ($C_1$ to $C_6$) alcohols, for example methanol, ethanol, n-propanol, i-propanol or butanol, and water, and also mixtures thereof. Particular preference is given to short-chain alcohols.

Examples of suitable precipitating agents are solutions of ammonium carbonate, ammonium hydroxide, ammonia, urea, alkali metal or alkaline earth metal carbonates and alkali metal or alkaline earth metal hydroxides in the aforementioned solvents.

The precipitation is preferably performed continuously. The metal salt solution and, if appropriate, the precipitating reagent and further doping components are mixed by means of conveying apparatuses in a mixing unit with high mixing intensity. Preference is given to using static mixers, Y mixers, multilamination mixers, valve mixers, μm mixers, (two-phase) nozzle mixers and further similar mixers known to those skilled in the art.

To improve the precipitation characteristics and for surface modification of the solids produced, it is possible to add surface-active substances (for example ionic or nonionic surfactants or carboxylic acids).

Advantageous and therefore preferred is a coprecipitation of the components which form the doped support, especially from alcoholic solution, for example with addition of ammonia solution, ammonium carbonate, ammonium hydroxide, urea, alkali metal carbonates and alkali metal hydroxides as the precipitating regent.

The doped support obtained in the form of a solid can be separated from the reactant solutions by methods known to those skilled in the art, for example sedimentation, filtration, centrifugation, evaporation and concentration. Preference is given to sedimentation and evaporation. The solid obtained can be washed further or used further directly, as obtained. For improved handling of the catalyst obtained, it can be dried. As is known for heterogeneous catalysts, further conditioning of the doped tin dioxide as the support may be advantageous. This conditioning may be calcination and thermal treatment, and treatment with reactive atmospheres or, for example, steam, with the aim of improving the catalytic properties. Preference is given to a thermal pretreatment in an oxidizing atmosphere, especially air, preferably at 250 to 1500° C., very preferably at 300 to 1200° C., more preferably from 700 to 1100° C. The conditioning may be preceded or followed by a shaping and/or classification.

According to the invention, the catalytically active component used is at least one ruthenium-containing compound. This is especially a ruthenium halide, ruthenium hydroxide, ruthenium oxide, ruthenium oxyhalide and/or ruthenium in metallic form.

Preference is given to a catalyst composition in which the ruthenium compound is a halogen- and/or oxygen-containing ruthenium compound.

The catalytically active component used is preferably a halogen-containing ruthenium compound. This is, for example, a compound in which halogen has ionic to polarized covalent bonding to a ruthenium atom.

The halogen in the preferred halogen-containing ruthenium compound is preferably selected from the group consisting of chlorine, bromine and iodine. Particular preference is given to chlorine.

The halogen-containing ruthenium compound includes those which consist exclusively of halogen and ruthenium. Preference is given, however, to those which contain both oxygen and halogen, especially chlorine or chloride. Particular preference is given to a catalyst composition in which the catalytically active ruthenium compound is selected from the group of: ruthenium chloride, ruthenium oxychloride and a mixture of ruthenium chloride and ruthenium oxide and especially a ruthenium oxychloride compound.

Particular preference is given to using at least one ruthenium oxychloride compound as the catalytically active species. A ruthenium oxychloride compound in the context of the invention is a compound in which both oxygen and chlorine have ionic to polarized covalent bonding to ruthenium. Such a compound thus has the general composition $RuO_xCl_y$. Preferably, various ruthenium oxychloride compounds of this kind may present alongside one another in the catalyst. Examples of defined particularly preferred ruthenium oxychloride compounds include especially the following compositions: $Ru_2Cl_4$, $RuOCl_2$, $Ru_2OCl_5$ and $Ru_2OCl_6$.

In a particularly preferred process, the halogen-containing ruthenium compound is a mixed compound corresponding to the general formula $RuCl_xO_y$ in which x is a number from 0.8 to 1.5 and y is a number from 0.7 to 1.6.

The catalytically active ruthenium oxychloride compound in the context of the invention is preferably obtainable by a process which comprises firstly the application of a solution or suspension, especially an aqueous solution or suspension, of at least one halogen-containing ruthenium compound to the doped tin dioxide and the removal of the solvent.

Other conceivable processes include the chlorination of nonchlorinated ruthenium compounds, such as ruthenium hydroxides, before or after the application of the ruthenium compound to the support.

A preferred process includes the application of an aqueous solution of $RuCl_3$ to the doped tin oxide.

The application of the ruthenium compound is generally followed by a drying step, which is appropriately effected in the presence of oxygen or air, in order at least partly to enable conversion to the preferred ruthenium oxychloride compounds. In order to prevent conversion of the preferred ruthenium oxychloride compounds to ruthenium oxides, the drying should preferably be conducted at less than 280° C., especially at at least 80° C., more preferably at least 100° C. The drying time is preferably 10 min to 6 h. The catalysts can be dried under standard pressure or preferably under reduced pressure.

A preferred process is characterized in that the catalyst is obtainable by calcining a doped tin dioxide support laden with a halogen-containing ruthenium compound at a temperature of at least 200° C., preferably at least 240° C., more preferably at least 250° C. to 500° C., especially in an oxygen-containing atmosphere, more preferably under air. The calcination time is preferably 30 min to 24 h.

In a particularly preferred process, the proportion of ruthenium from the catalytically active ruthenium compound in relation to the overall catalyst composition, especially after calcination, is 0.5 to 5% by weight, preferably 1.0 to 4% by weight, more preferably 1.5 to 3% by weight.

If the catalytically active species applied are to be halogen-ruthenium compounds which do not contain any oxygen, it is also possible to dry at higher temperatures with exclusion of oxygen.

The catalyst is preferably obtainable by a process which comprises the application of an aqueous solution or suspension of at least one halogen-containing ruthenium compound to the doped tin dioxide and subsequent drying at less than 280° C., and subsequent activation under the conditions of the gas phase oxidation of hydrogen chloride, in the course of which substantial conversion to the ruthenium oxychlorides takes place. The longer the drying period in the presence of oxygen, the more oxychloride is formed.

In a particularly preferred variant, an oxygen-containing ruthenium compound is applied to the support. This is a compound in which oxygen has ionic to polarized covalent bonding to a ruthenium atom. This compound is prepared by the application of an aqueous solution or suspension of at least one halide-containing ruthenium compound to the doped tin dioxide and subsequent precipitation by means of an alkaline compound to give ruthenium hydroxide, and optionally the calcination of the precipitated product.

The precipitation can be conducted under alkaline conditions to directly form the oxygen-containing ruthenium compound. It can also be performed under reducing conditions with primary formation of metallic ruthenium, which is subsequently calcined with supply of oxygen to form the oxygen-containing ruthenium compound.

A preferred process includes application by impregnation, soaking etc. of an aqueous solution of $RuCl_3$ to the doped tin dioxide.

The application of the halide-containing ruthenium compound is generally followed by a precipitation step and a drying or calcination step, which is appropriately effected in the presence of oxygen or air at temperatures of up to 650° C.

More preferably, the catalytically active component, i.e. the ruthenium-containing compound, can be applied to the support, for example by moist and wet impregnation of a support with suitable starting compounds present in solution or starting compounds in liquid or colloidal form, precipitation and coprecipitation processes, and ion exchange and gas phase coating (CVD, PVD).

The inventive catalysts for hydrogen chloride oxidation are notable for a high activity and a high stability at low temperatures.

Preferably, as already described above, the novel catalyst composition is used in the catalytic process known as the Deacon process or HCl gas phase oxidation. In this process, hydrogen chloride is oxidized with oxygen in an exothermic equilibrium reaction to chlorine, forming water vapor. The reaction temperature is typically 180 to 500° C., more preferably 200 to 450° C., especially preferably 250 to 420° C.; the customary reaction pressure is 1 to 25 bar, preferably 1.2 to 20 bar, more preferably 1.5 to 17 bar, most preferably 2 to 15 bar. Since the reaction is an equilibrium reaction, it is appropriate to work at minimum temperatures at which the catalyst still has a sufficient activity. It is also appropriate to use oxygen in superstoichiometric amounts relative to hydrogen chloride. For example, a two- to four-fold oxygen excess is typical. Since there is no risk of any selectivity losses, it may be economically advantageous to work at relatively high pressure and correspondingly with a longer residence time relative to standard pressure.

Suitable catalysts may contain, in addition to the ruthenium compound, also compounds of other metals or noble metals, for example gold, palladium, platinum, osmium, iridium, silver, copper, cerium, chromium or rhenium.

The catalytic hydrogen chloride oxidation can preferably be performed adiabatically or isothermally or virtually isothermally, batchwise but preferably continuously, as a fluidized bed or fixed bed process, preferably as a fixed bed process, more preferably adiabatically at a reactor temperature of 180 to 500° C., preferably 200 to 450° C., more preferably 250 to 420° C., and a pressure of 1 to 25 bar (1000 to 25 000 hPa), preferably 1.2 to 20 bar, more preferably 1.5 to 17 bar and especially preferably 2.0 to 15 bar.

Typical reaction apparatuses in which the catalytic hydrogen chloride oxidation is performed are fixed bed or fluidized bed reactors. The catalytic hydrogen chloride oxidation can preferably also be performed in a plurality of stages.

In the adiabatic, isothermal or virtually isothermal process regime, but preferably in the adiabatic process regime, it is also possible to use a plurality of, especially 2 to 10, preferably 2 to 6, reactors connected in series with intermediate cooling. The hydrogen chloride can either be added completely together with the oxygen upstream of the first reactor or distributed over the different reactors. This series connection of individual reactors can also be combined in one apparatus.

A further preferred embodiment of an apparatus suitable for the process consists in using a structured catalyst bed in which the catalyst activity rises in flow direction. Such a structuring of the catalyst bed can be accomplished through different impregnation of the catalyst supports with active material or through different dilution of the catalyst with an inert material. The inert materials used may, for example, be rings, cylinders or spheres of titanium dioxide, zirconium dioxide or mixtures thereof, aluminum oxide, steatite, ceramic, glass, graphite or stainless steel. In the case of the preferred use of shaped catalyst bodies, the inert material should preferably have similar external dimensions.

Suitable shaped catalyst bodies include shaped bodies with any desired forms, preference being given to tablets, rings, cylinders, stars, wagonwheels or spheres, particular preference being given to rings, cylinders, spheres or star extrudates, as the form. Preference is given to the spherical form. The size of the shaped catalyst bodies, for example diameter in the case of spheres or maximum cross-sectional width, is, on average, especially 0.3 to 7 mm, very preferably 0.8 to 5 mm.

Alternatively to the above-described finely divided (shaped) catalyst bodies, the support may also be a monolith of support material, for example not just a "conventional" support body with parallel channels not connected radially to one another; also included are foams, sponges or the like, with three-dimensional connections within the support body to form the monoliths, and support bodies with crossflow channels.

The monolithic support may have a honeycomb structure, or else an open or closed cross-channel structure. The monolithic support possesses a preferred cell density of 100 to 900 cpsi (cells per square inch), more preferably of 200 to 600 cpsi.

A monolith in the context of the present invention is disclosed, for example, in "Monoliths in multiphase catalytic processes—aspects and prospects", by F. Kapteijn, J. J. Heiszwolf T. A. Nijhuis and J. A. Moulijn, Cattech 3, 1999, p. 24.

Suitable additional support materials or binders for the support are particularly, for example, silicon dioxide, graphite, titanium dioxide with rutile or anatase structure, zirconium dioxide, aluminum oxide or mixtures thereof, preferably titanium dioxide, zirconium oxide, aluminum oxide or mixtures thereof, more preferably γ- or δ-aluminum oxide or mixtures thereof. A preferred binder is aluminum oxide or zirconium oxide. The proportion of binder may, based on the finished catalyst, be 1 to 30% by weight, preferably 2 to 25% by weight and very preferably 5 to 20% by weight. The binder increases the mechanical stability (strength) of the shaped catalyst bodies.

In a particularly preferred variant of the invention, the catalytically active component is present essentially on the surface of the actual support material, for example of the doped tin dioxide, but not on the surface of the binder.

For additional doping of the catalysts, suitable promoters are alkali metals or metal compounds such as lithium, sodium, potassium, rubidium and cesium, preferably lithium, sodium and potassium, more preferably potassium, alkaline earth metals such as magnesium, calcium, strontium and barium, preferably magnesium and calcium, more preferably magnesium, rare earth metals such as scandium, yttrium, lanthanum, cerium, praseodymium and neodymium, preferably scandium, yttrium, lanthanum and cerium, more preferably lanthanum and cerium, or mixtures thereof.

The promoters may, without being restricted thereto, be applied to the catalyst by impregnation and CVD processes, preference being given to impregnation, for example of metal compounds, especially nitrates, and special preference being given to combined application with the catalytic main component.

The conversion of hydrogen chloride in the HCl oxidation in single pass can preferably be limited to 15 to 90%, preferably 40 to 90%, more preferably 70 to 90%. Unconverted hydrogen chloride can, after removal, be recycled partly or fully into the catalytic hydrogen chloride oxidation. The volume ratio of oxygen to hydrogen chloride at the reactor inlet is preferably 1:2 to 20:1, preferably 2:1 to 8:1, more preferably 2:1 to 5:1.

The heat of reaction of the catalytic hydrogen chloride oxidation can advantageously be utilized to raise high-pressure steam. This steam can be utilized to operate a phosgenation reactor and/or distillation columns, especially isocyanate distillation columns.

In a further step, the chlorine formed is removed. The removal step typically comprises a plurality of stages, specifically the removal and optional recycling of unconverted hydrogen chloride from the product gas stream of the catalytic hydrogen chloride oxidation, the drying of the resulting stream comprising essentially chlorine and oxygen, and the removal of chlorine from the dried stream.

Unconverted hydrogen chloride and steam formed can be removed by condensing aqueous hydrochloric acid out of the product gas stream of the hydrogen chloride oxidation by cooling. Hydrogen chloride can also be absorbed in dilute hydrochloric acid or water.

The invention further provides for the use of doped tin dioxide as a catalyst support for a catalyst in the catalytic gas phase oxidation of hydrogen chloride with oxygen.

The invention further provides for the use of the novel catalyst composition as a catalyst, especially for oxidation reactions, more preferably as a catalyst in the catalytic gas phase oxidation of hydrogen chloride with oxygen.

The examples which follow illustrate the present invention:

EXAMPLES

Example 1

Inventive

Preparation of Nb-Doped $SnO_2$ by Coprecipitation

At room temperature, a solution having a concentration of 0.2 mol/l $SnCl_4$ or 8.1 mmol/l $NbCl_5$ in i-propanol and a solution of 0.1 mol/l $NH_3$ in deionized $H_2O$ was conveyed by means of pumps through a valve mixer (from Ehrfeld), so as to ensure intensive continuous mixing. The suspension strand formed was collected in a beaker while stirring, in the course of which the pH was kept at pH=9.2. The volume flow rate of solution A was 250 ml/h. The volume flow rate of solution B was at first 500 ml/h and was adjusted constantly in order to ensure a constant pH. The solid thus obtained was centrifuged off and then washed with deionized $H_2O$ to free it of $NH_3$. The filtercake was dried at 120° C. under air overnight and subsequently calcined at 1000° C. under air for 2 h. The theoretical Nb content in the $SnO_2$ thus prepared is 2.5% by weight. By means of TEM-EDX (measurement according to manufacturer's instructions, from Fei, TECNAI 20 model with EDX detector from EDAX, PV9760/98 GE model), it was possible to detect a homogeneous distribution of the Nb in the $SnO_2$ matrix.

Example 2

Inventive

Supporting of Ruthenium Chloride on Nb-Doped $SnO_2$ 1.68 g of the doped $SnO_2$ prepared in example 1 were suspended in a round-bottom flask in a solution of commercially available 0.0865 g of ruthenium chloride n-hydrate in 5 ml of water and stirred at room temperature for 180 min. The excess solution was concentrated at 60° C. overnight. The resulting solid was subsequently calcined in an air stream at 250° C. for 16 h, which afforded a ruthenium chloride catalyst supported on doped $SnO_2$. The amount of ruthenium supported corresponds to a proportion of 2.01% by weight.

Example 3

Inventive

Supporting of Ruthenium Chloride on Nb-Doped $SnO_2$ Shaped Bodies 50 g of spherical Nb—$SnO_2$ shaped bodies (manufacturer: Saint-Gobain, Nb—$SnO_2$ corresponding to example 1) having an average diameter of 1.9 mm and a BET surface area of 47.6 m$^2$/g were impregnated with a solution of 2.64 g of commercial ruthenium chloride n-hydrate and 0.258 g of $CeCl_3$ in 10 g of $H_2O$. After standing for 1 h, the solid was dried in an air stream at approx. 60° C. within 5 h. Subsequently, the catalyst was calcined at 250° C. for 16 h. This gives a catalyst calculated to have 2% by weight of ruthenium.

Example 4

Comparative Example

Supporting of Ruthenium Chloride on Commercial $SnO_2$ Powder

In accordance with example 2, a Ru-containing catalyst were prepared on commercial $SnO_2$ (from MEI, BET 8.1 m$^2$/g). The Ru content corresponds to a content of 2% by weight.

Example 5

Comparative Example

Supporting of Ruthenium Chloride on Commercial $SnO_2$ Shaped Bodies 50 g of spherical $SnO_2$ shaped bodies (manufacturer: Saint-Gobain, commercial $SnO_2$) having an average diameter of 1.9 mm and a BET surface area of 47.6 m²/g were impregnated with a solution of 2.6397 g of commercial ruthenium chloride n-hydrate and 0.2582 g of CeCl₃ in 8.3 g of H₂O. After standing for 1 h, the solid was dried in an air stream at approx. 60° C. within 5 h. Subsequently, the catalyst was calcined at 250° C. for 16 h. This gives a catalyst calculated to have 2% by weight of ruthenium.

Catalyst Test Example 6

Use of the Catalyst from Example 2 in HCl Oxidation

A gas mixture of 80 ml/min (standard conditions, STP) of hydrogen chloride and 80 ml/min (STP) of oxygen flowed through 0.2 g of the pulverulent catalyst according to example 2 in a fixed bed in a quartz reaction tube (internal diameter 10 mm) at 300° C. The quartz reaction tube was heated by an electrically heated fluidized sand bed. After 30 min, the product gas stream was passed into 16% by weight potassium iodide solution for 15 min. The iodine formed was then back-titrated with 0.1 N standard thiosulfate solution in order to determine the amount of chlorine introduced. A chlorine formation rate of 2.79 $kg_{Cl2}/kg_{CAT} \cdot h$ was measured.

Catalyst Test Example 7

Use of the Catalyst from Example 3 in HCl Oxidation 25 g of the catalyst according to example 3 were installed together with 75 g of inert material (glass beads) in a nickel fixed bed reactor (diameter 22 mm, length 800 mm) heated with an oil bath. This afforded a fixed bed of approx. 150 mm. The fixed bed was heated by means of a heat carrier heated to 350° C. At a pressure of 4 bar, a gas mixture of 40.5 l/h (STP) of hydrogen chloride, 315 l/h (STP) of oxygen and 94.5 l/h (STP) of nitrogen flowed through the fixed bed reactor. After a defined reaction time (for example 30 min), the product gas stream was passed into 16% potassium iodide solution for 5 min. The iodine formed was then back-titrated with 0.1 N standard thiosulfate solution in order to determine the amount of chlorine introduced. The conversion calculated therefrom was 85%. After a run time of 3108 min, a condensed reaction sample was analyzed for the Sn content by means of ICP-OES (Inductively Coupled Plasma-Optical Emissions Spectrometry, instrument: Varian Vista-PRO, method according to manufacturer's instructions). The analyzed content of tin was 3 ppm.

Catalyst Test Example 8

Comparative Example

Use of the Catalyst from Example 4 in HCl Oxidation 0.2 g of the catalyst according to example 4 were tested analogously to catalyst test example 6. A chlorine formation rate of 2.34 $kg_{Cl2}/kg_{CAT} \cdot h$ was measured.

Catalyst Test Example 9

Comparative Example

Use of the Catalyst from Example 5 in HCl Oxidation 25 g of the catalyst according to example 5 were tested analogously to catalyst test example 7. The analysis for tin in the condensate was conducted by means of ICP-OES (Inductively Coupled Plasma-Optical Emission Spectrometry, instrument: Varian Vista-PRO, method according to manufacturer's instructions). The condensate sample contains 35 ppm of Sn.

The results are summarized below:

| | Chlorine formation rate $kg_{Cl2}/kgKAT \cdot h$ | Sn concentration in the condensate ppm |
|---|---|---|
| Catalyst 2 (inventive) | 2.79 | |
| Catalyst test example 6 | | |
| Catalyst 3 (inventive) | | 3 |
| Catalyst test example 7 | | |
| Catalyst 4 | 2.34 | |
| Catalyst test example 8 | | |
| Catalyst 5 | | 35 |
| Catalyst test example 9 | | |

It becomes clear from the test results listed in the table above that the stability of the support material is considerably improved since the tin output from the inventive catalyst support is reduced to one tenth. Moreover, increased activity of the inventive catalyst system compared to the known catalyst system is found.

The invention claimed is:

1. A catalyst composition comprising at least tin dioxide as a support material and at least one ruthenium-containing compound as a catalytically active material, wherein the support material comprises, as an additional secondary constituent, a compound of an element or an element selected from the group consisting of: Nb, V, Ta, Cr, Mo, Au, In, Sc, Y and lanthanoids.

2. The composition as claimed in claim 1, wherein the additional secondary constituent is niobium or a niobium compound.

3. The composition as claimed in claim 2, wherein the additional secondary constituent is niobium oxide.

4. The composition as claimed in claim 1, wherein the additional secondary constituent is La or Ce.

5. The composition as claimed in claim 1, wherein the ruthenium compound is a halogen- and/or oxygen-containing ruthenium compound.

6. The composition as claimed in claim 5, wherein the halogen in the ruthenium compound is selected from the group consisting of: chlorine, bromine and iodine.

7. The composition as claimed in claim 1, wherein the catalytically active ruthenium compound is selected from the group consisting of: ruthenium chloride, ruthenium oxychloride and a mixture of ruthenium chloride and ruthenium oxide.

8. The composition as claimed in claim 7, wherein the catalytically active ruthenium compound is a mixed compound corresponding to the general formula $RuCl_xO_y$, in which x is a number from 0.8 to 1.5 and y is a number from 0.7 to 1.6.

9. The composition as claimed in claim 1, wherein the proportion of the secondary constituent is in the range from 0.01 to 30% by weight based on the total weight of tin dioxide and secondary constituent.

10. The composition as claimed in claim 1, wherein the catalyst composition is obtained by a process comprising at least the following steps:
A) preparing a solution or suspension of at least one halogen-containing ruthenium compound,
B) preparing a solution of soluble tin salts and salts of elements selected from the group consisting of: Nb, V, Ta, Cr, Mo, Au, In, Sc, Y and lanthanoids, and coprecipitating the tin and the element for the secondary constituent, C) thermally treating the precipitated mixture of tin and further element in the presence of oxidizing gases to obtain a doped tin dioxide, and D) applying the solution or suspension of at least one halogen-containing ruthenium compound according to step A) to the doped tin dioxide and removing the solvent.

11. The composition as claimed in claim 10, wherein the halogen-containing ruthenium compound used in step A) is $RuCl_3$.

12. The composition as claimed in claim 10, wherein the catalyst is obtained by a process in which the removal of the solvent comprises drying at at least 80° C.

13. The composition as claimed in claim 1, wherein the catalyst composition is obtained by calcinating a tin dioxide support laden with a halogen-containing ruthenium compound at a temperature of at least 200° C. in an oxygen-containing atmosphere.

14. The composition as claimed in claim 1, wherein the proportion of ruthenium from the halogen-containing ruthenium compound in relation to the overall catalyst composition is 0.5 to 5% by weight.

15. The composition as claimed in claim 1, wherein the tin dioxide is at least partially in cassiterite form.

16. The composition as claimed in claim 1, wherein the tin dioxide is completely in cassiterite form.

17. A process for preparing chlorine by catalytic gas phase oxidation of hydrogen chloride with oxygen over a solid catalyst, comprising conducting the gas phase oxidation adiabatically or isothermally, in which the catalyst comprises at least tin dioxide as a support material and at least one ruthenium-containing compound as a catalytically active material, wherein the catalyst used is a composition as claimed in claim 1.

18. The process as claimed in claim 17, wherein the gas phase oxidation of the hydrogen chloride comprises the passage of a gas comprising hydrogen chloride and oxygen at a temperature of 180 to 500° C. and the chlorine formed is separated from the water of reaction and any unconverted oxygen and hydrogen chloride.

19. The process as claimed in claim 17, wherein the gas phase oxidation is conducted at a pressure of 1 to 25 bar.

20. A method for the catalytic gas phase oxidation of hydrogen chloride with oxygen comprising utilizing tin dioxide doped with niobium or a niobium compound as secondary constituent as a catalyst support for a catalyst.

* * * * *